United States Patent [19]

Gasser

[11] Patent Number: 4,653,191

[45] Date of Patent: Mar. 31, 1987

[54] DEVICE FOR CHECKING THE SETTING OF THE ARROW GUIDE BUTTON ON A SPORTS BOW

[76] Inventor: Max Gasser, 9442 Berneck, Switzerland

[21] Appl. No.: 774,645

[22] Filed: Sep. 11, 1985

[30] Foreign Application Priority Data

Sep. 17, 1984 [CH] Switzerland .......................... 4439/84

[51] Int. Cl.⁴ ............................................... G01B 5/14
[52] U.S. Cl. ................................. 33/169 R; 73/862.62
[58] Field of Search ................. 33/265, 169 R, 169 B; 124/23 R, 24 R, 86, 88; 73/13, 161, 380, 862.38, 862.54, 862.62

[56] References Cited

U.S. PATENT DOCUMENTS 1,825,491 9/1931 Walters ............................ 73/862.62
2,400,371 5/1946 Reeser ................................ 33/169 B
2,520,022 8/1950 Vobeda ................................... 33/167
3,482,563 12/1969 Pint .................................... 124/24 R
4,432,246 2/1984 Granat .............................. 73/862.54

Primary Examiner—Charles Frankfort
Assistant Examiner—Patrick R. Scanlon
Attorney, Agent, or Firm—Saul Jecies

[57] ABSTRACT

A device for checking the setting on a sports bow having a bow window and a spring-biased arrow guide button projecting from the bow window includes a measuring sleeve provided with a scale to measure the projection of the arrow guide button from the bow window when being in contact with the arrow guide button. For measuring the spring force acting on the arrow guide button, the sleeve accommodates a spring bolt which is provided with a marking. By screwing a setting nut and a counter nut on the sleeve, the spring bolt is forced against the arrow guide button until the marking appears in a viewing window of the sleeve. The spring force can then be read on another scale displayed on the sleeve.

1 Claim, 4 Drawing Figures

DEVICE FOR CHECKING THE SETTING OF THE ARROW GUIDE BUTTON ON A SPORTS BOW

BACKGROUND OF THE INVENTION

The art of archery is shrouded in antiquity. Originally, prominent in battles it is now used in sports. While used in battles the shape and size of the bows were standard.

The long bow invented by the English brought to an end the knightly supremacy which since then resided in the infantry.

Not much change has taken place since then until archery as a sport began to penetrate the upper classes.

THE PRESENT INVENTION

The bow proper has a slot which is generally referred to as the bow window.

In the region of the bow window a guide button referred to as the "Berger-Button" by its inventor is attached to the bow.

Approximately half of the arrow weight is in the arrow tip, making the center of gravity near the tip. The shank of the arrow is designed to be flexible. The result is that the arrow tends to deviate sidewise from a straight trajectory. It is the arrow guide button which is designed to correct this deviation.

The guide button protrudes to the side from the bow window and is pressed by a spring against the shank of the arrow placed on the arrow rest. The length of the part of the arrow guide button protruding from the bow window and the spring force are adjustable. The original setting depends on the features of the arrow such as the thickness of the arrow shank and the marksman such as his strength, his height and aiming idiosyncrasies. The arrow guide button requires checking from time to time that is after prolonged shooting, transporting the bow or vibration.

It is one of the main features of the present application that the arrow guide button can be checked and adjusted.

DRAWINGS

DETAILED DESCRIPTION

Figure 1:
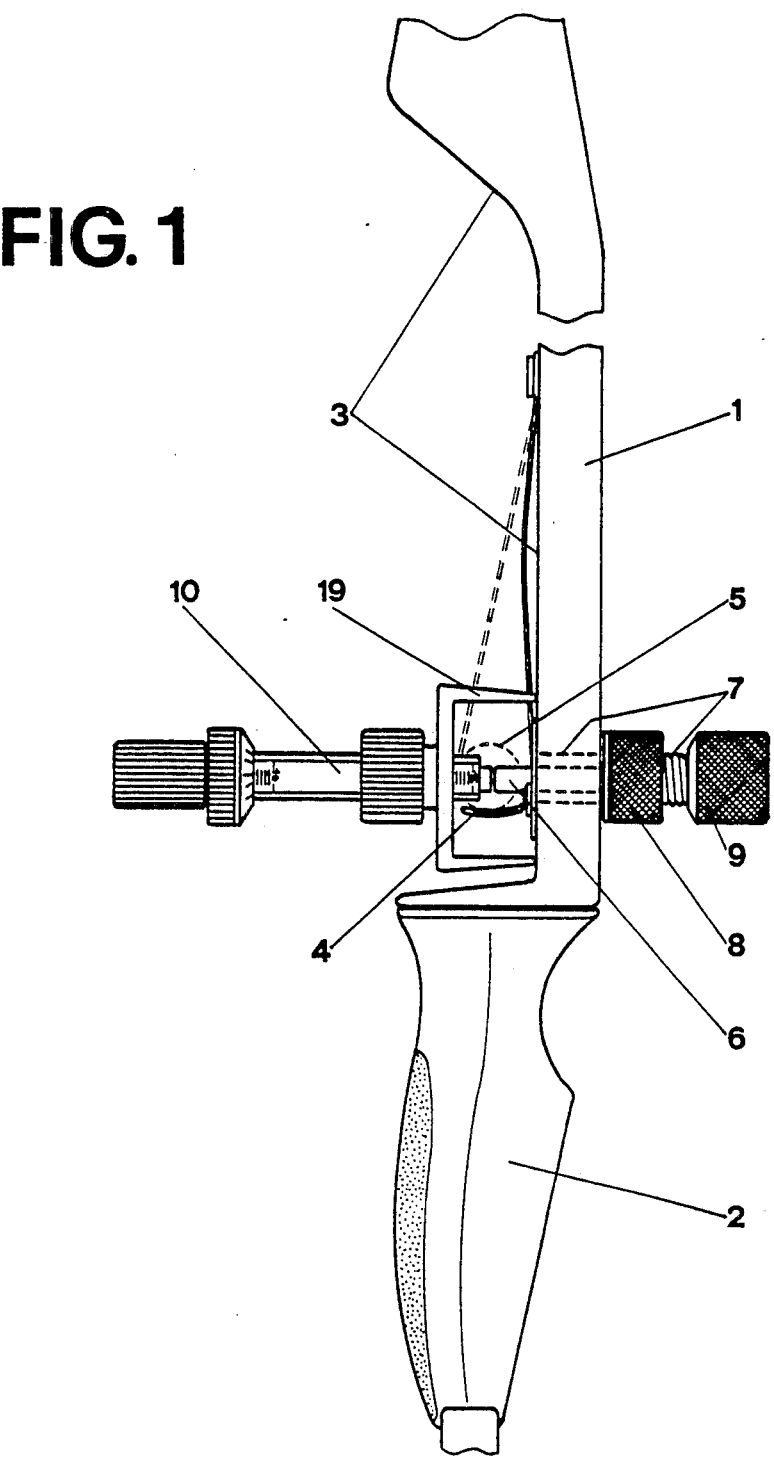
FIG. 1 illustrates a check of the bow center piece with bow checking devise attached thereto.
Figure 2:
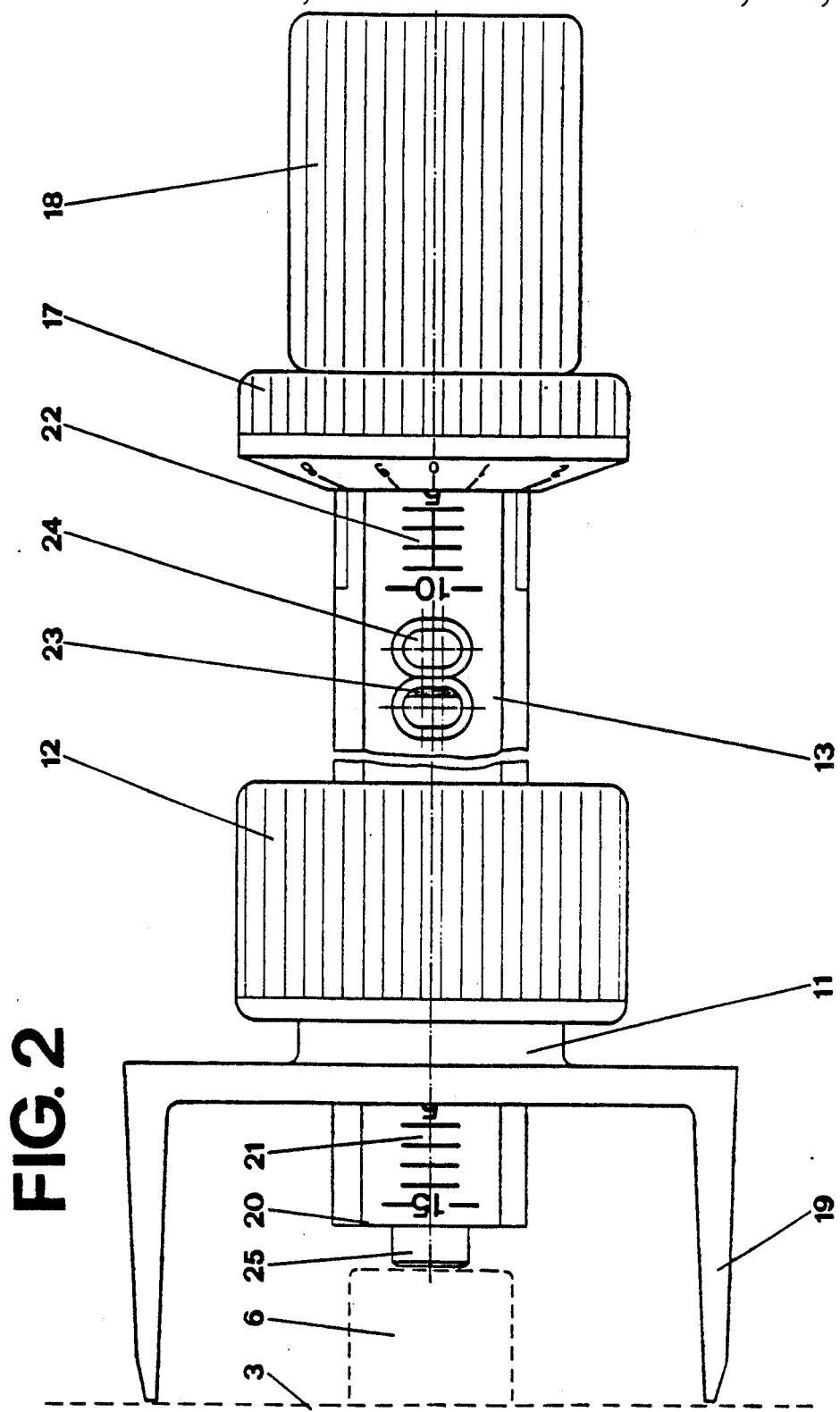
FIG. 2 shows an enlarged view of the checking device.
Figure 3:
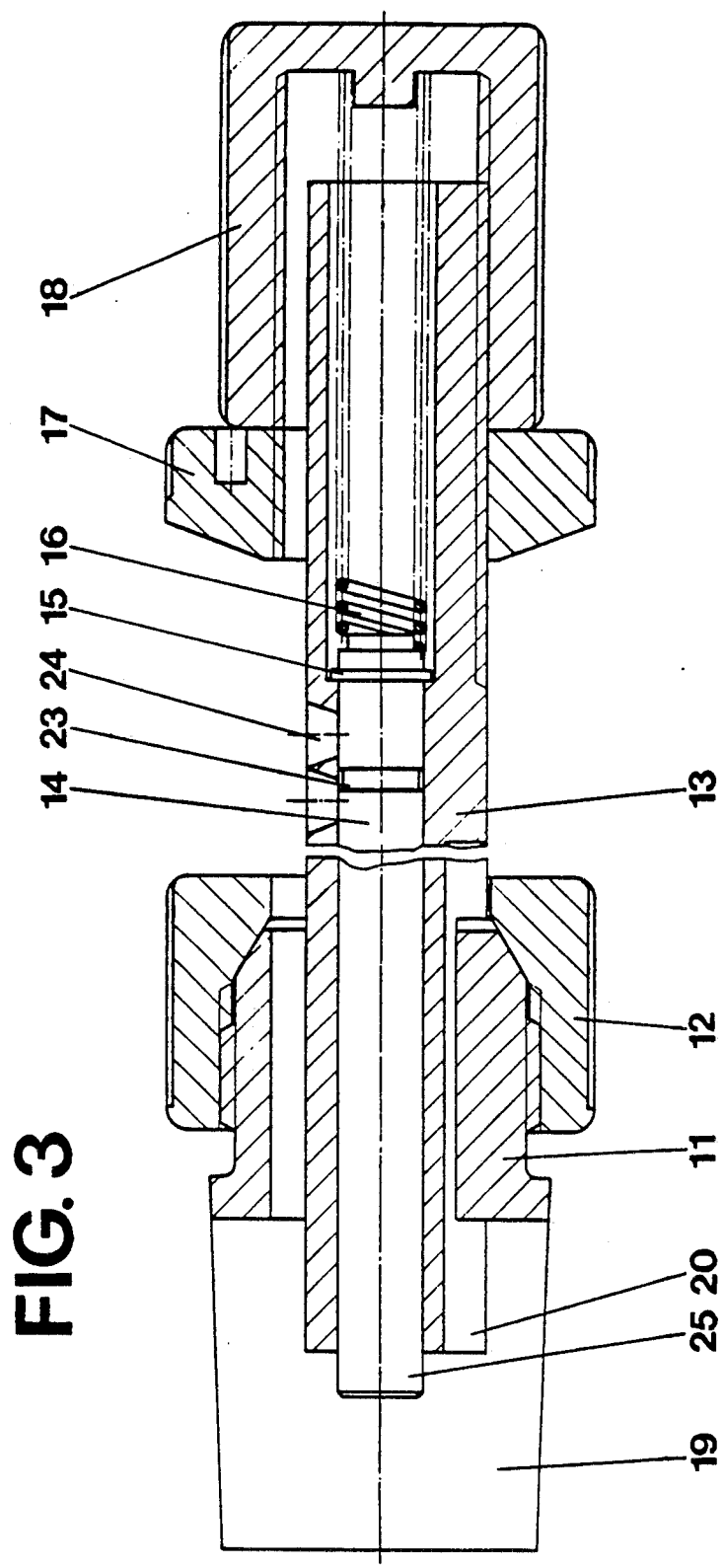
FIG. 3 shows a longitudinal section through the device illustrated in FIG. 2.
Figure 4:
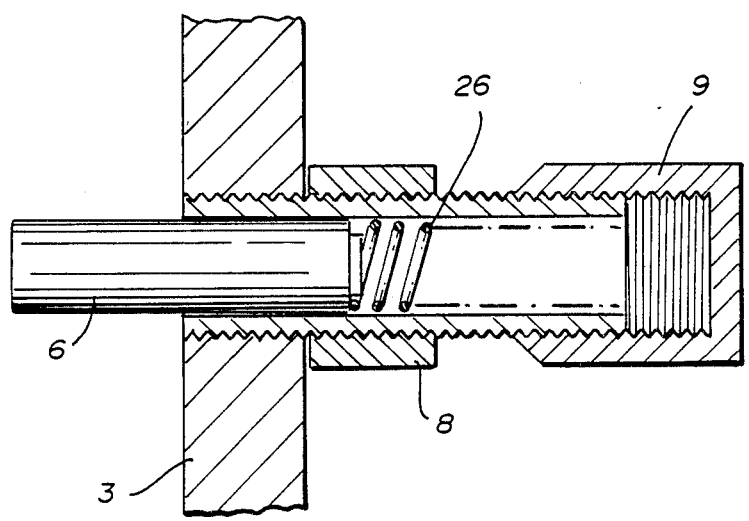
FIG. 4 shows a cross sectional view of the spring mechanism acting on the arrow guide button.

The section of the bow center piece 1 illustrated in FIG. 1 essentially consists of the handle 2 and the bow window 3. In the lower region of the bow window 3 is mounted the arrow rest 4. An arrow 5 lying on it is indicated by broken lines. On a level with the longitudinal axis of the arrow 5 protrudes the arrow guide button 6 from the bow window 3 and presses against the arrow shank by the force of a spring 26 arranged in the tube piece 7. Unlike the illustration here, in resting an arrow 5 the arrow guide button 6 would be pressed back by the arrow shank almost completely into the tube piece 7. The tube piece 7 is provided with an outer thread and is mounted in a threaded bore in the bow center piece 1. By means of a nut 8, the length of the part of the arrow guide button 6 protruding from the bow window 3 can be set and, by a further nut 9, the spring force with which the arrow guide button is pressed out is set.

Checking devise 10 is attached to the bow center piece 1.

The checking device 10 consists of an alignment element 11, a tightening nut 12 screwed on to it, a measuring sleeve 13 with spring bolt 14 guided therein and with circlip 15, which cooperates with a stop in the measuring sleeve 13 to limit the movement of the spring bolt 14 towards the arrow guide button 6 a compression spring 16, likewise in the measuring sleeve 13, and a spring setting nut 18 with counter-nut 17, screwed onto the end of the measuring sleeve 13.

To check the setting of the arrow guide button 6, the checking device 10 is fitted in the region of the arrow guide button 6 on the bow window 3 with the forked attachment 19 of the alignment element 11, as shown in FIG. 1. Then the tightening nut 12 is loosened and the measuring sleeve 13 is pushed in the direction of the arrow guide button 6 until the free end 20 of the measuring sleeve 13 is in contact with the arrow guide button 6. The tightening nut 12 can then be tightened again. How much the arrow guide button 6 protrudes from the bow window 3 can then be read off on the length measuring scale 21 made on the measuring sleeve 13.

The spring force with which the arrow guide button 6 is pressed out of the bow window 3 can be read off on the pressure measuring scale 22. In the measuring process, the marking 23 of the spring bolt 14 must be visible in the viewing window 24. In the initial stage, when attaching the checking device 10, the arrow guide button 6 will push back the spring bolt 14 due to the force exerted by the spring 26 within tube 7. Screwing up the spring setting nut 18 and the counter-nut 17 onto the measuring sleeve 13 causes the compression spring 16 to be tensioned thereby pressing the spring bolt 14 towards the arrow guide button 6 until the marking 23 is visible in the viewing window 24. The force of the arrow guide button 6 in contact with the end 25 of the spring bolt 14 will have to be correspondingly greater to enable it to press the spring bolt 14 into the measuring sleeve 13 far enough for the marking 23 to be visible in the viewing window 24.

Since the desired values are set on the checking device 10, by attaching it to the bow it is possible to recheck at any time whether the setting of the arrow guide button 6 is still correct. Should this not be the case, the nuts 8 and 9 attached on the bow can be used to readjust the arrow guide button 6.

I claim:

1. A checking device for checking the setting on a sports bow provided with a bow window, an arrow guide button protruding from the bow window towards an arrow and movable in a longitudinal direction of said arrow guide button and spring means acting on the arrow guide button for pressing the guide button against the arrow; said checking device comprising:

first means for measuring the length of the arrow guide button which protrudes from the bow window, said first means including a measuring sleeve provided at an outer end therefore with a length measuring scale, an elongated spring bolt which is longitudinally movable within the measuring sleeve against pressure from a compression spring and an inner end of the spring bolt having a circlip which limits axial movement of the spring bolt by abutting against a stop in the measuring sleeve, the spring bolt having an outer end protruding from said outer end of the measuring sleeve against the arrow guide button due to the pressure of the compression spring;

second means for measuring the pressure exerted by the spring means on the arrow guide button, said second means including a spring setting nut with a counter-nut longitudinally screwable on the inner end of the measuring sleeve so as to tension the compression spring by a known amount and thus to force the spring bolt against the arrow guide button with a known force, the measuring sleeve including in the region of the counter-nut a pressure measuring scale which indicates the pressure exerted by the spring means onto the arrow guide button when a marking provided on the spring bolt is visible through a viewing window in the measuring sleeve; and an alignment element provided with a forked attachment for aligning the first and second means with the arrow guide button, the alignment element being arranged adjacent said outer end of the measuring sleeve and overlapping the length measuring scale and including a tightening nut for adjustably locking the alignment element on the measuring sleeve whereby, when the forked attachment is placed against the bow window, the measuring sleeve can be adjusted relative to the alignment element to abut against the guide button and the length measuring scale thereon indicates the length of protrusion of the guide button.

* * * * *